(12) United States Patent
Goel et al.

(10) Patent No.: US 9,490,866 B2
(45) Date of Patent: Nov. 8, 2016

(54) PASSIVE LEAKAGE CANCELLATION NETWORKS FOR DUPLEXERS AND COEXISTING WIRELESS COMMUNICATION SYSTEMS

(71) Applicants: Ankush Goel, San Jose, CA (US);
Behnam Analui, Irvine, CA (US);
Hossein Hashemi, Pacific Palisades, CA (US)

(72) Inventors: Ankush Goel, San Jose, CA (US);
Behnam Analui, Irvine, CA (US);
Hossein Hashemi, Pacific Palisades, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 0 days.

(21) Appl. No.: 14/102,244

(22) Filed: Dec. 10, 2013

(65) Prior Publication Data

US 2014/0376419 A1    Dec. 25, 2014

Related U.S. Application Data

(60) Provisional application No. 61/735,783, filed on Dec. 11, 2012, provisional application No. 61/805,078, filed on Mar. 25, 2013.

(51) Int. Cl.
*H04B 7/005* (2006.01)
*H04B 1/525* (2015.01)

(52) U.S. Cl.
CPC .................................... *H04B 1/525* (2013.01)

(58) Field of Classification Search
USPC ................................. 370/252, 277, 278, 286
See application file for complete search history.

(56) References Cited

U.S. PATENT DOCUMENTS 2,561,212 A    7/1951 Lewis
4,464,675 A *  8/1984 Balaban et al. .............. 348/665
(Continued)

FOREIGN PATENT DOCUMENTS

DE    102012107877 A1    2/2014
EP       1091497 A1      4/2001
(Continued)

OTHER PUBLICATIONS

Korean International Searching Authority (ISA/KR). 2014. International Search Report and Written Opinion of the International Searching Authority, mailed Sep. 23, 2014, for counterpart PCT Application No. PCT/US2013/07455, filed Dec. 10, 2013, entitled "Passive Leakage Cancellation Networks for Duplexers and Coexisting Wireless Communication Systems."

(Continued)

*Primary Examiner* — Ricky Ngo
*Assistant Examiner* — Christine Ng
(74) *Attorney, Agent, or Firm* — McDermott Will & Emery LLP

(57) ABSTRACT

A passive cancellation network may include a transmit input having a configuration that passively receives a transmit signal from a transmitter that is to be wirelessly transmitted; a transmit output having a configuration that passively delivers the transmit signal after processing by the passive cancellation network; a receive input having a configuration that passively receives a receive signal that includes undesirable leakage from the transmit signal; a receive output having a configuration that passively delivers the receive signal after processing by the passive cancellation network; and a passive feed forward cancellation circuit that passively cancels at least a portion of the undesired leakage from the transmit signal in the receive signal in a feed forward manner.

9 Claims, 11 Drawing Sheets

(56) References Cited

U.S. PATENT DOCUMENTS

| | | |
|---|---|---|
| 4,694,266 A | 9/1987 | Wright |
| 4,963,945 A | 10/1990 | Cooper et al. |
| 4,968,967 A | 11/1990 | Stove |
| 5,493,246 A * | 2/1996 | Anderson .................... 327/382 |
| 5,691,978 A | 11/1997 | Kenworthy |
| 6,194,980 B1 | 2/2001 | Thon |
| 6,229,992 B1 | 5/2001 | McGeehan et al. |
| 6,721,544 B1 | 4/2004 | Franca-Neto |
| 6,819,302 B2 | 11/2004 | Volman |
| 7,072,614 B1 * | 7/2006 | Kasperkovitz ............... 455/296 |
| 7,116,966 B2 | 10/2006 | Hattori et al. |
| 7,123,883 B2 | 10/2006 | Mages |
| 7,250,830 B2 | 7/2007 | Layne et al. |
| 7,330,500 B2 | 2/2008 | Kouki |
| 7,623,005 B2 | 11/2009 | Johansson et al. |
| 7,633,435 B2 | 12/2009 | Meharry et al. |
| 7,711,329 B2 | 5/2010 | Aparin et al. |
| 7,804,383 B2 | 9/2010 | Volatier et al. |
| 7,894,779 B2 | 2/2011 | Meiyappan et al. |
| 8,013,690 B2 | 9/2011 | Miyashiro |
| 8,135,348 B2 | 3/2012 | Aparin |
| 8,149,742 B1 | 4/2012 | Sorsby |
| 8,199,681 B2 | 6/2012 | Zinser et al. |
| 8,385,871 B2 | 2/2013 | Wyville |
| 8,422,412 B2 | 4/2013 | Hahn |
| 8,514,035 B2 | 8/2013 | Mikhemar et al. |
| 8,600,329 B1 * | 12/2013 | Comeau et al. ............... 455/296 |
| 8,749,321 B2 | 6/2014 | Kim et al. |
| 2002/0089396 A1 | 7/2002 | Noguchi et al. |
| 2003/0109077 A1 | 6/2003 | Kim et al. |
| 2004/0000425 A1 | 1/2004 | White et al. |
| 2004/0127178 A1 | 7/2004 | Kuffner |
| 2004/0180633 A1 * | 9/2004 | Nakatani et al. ............. 455/103 |
| 2005/0070232 A1 | 3/2005 | Mages |
| 2007/0105509 A1 * | 5/2007 | Muhammad ............ H03C 5/00 455/106 |
| 2008/0128901 A1 | 6/2008 | Zurcher et al. |
| 2008/0227409 A1 | 9/2008 | Chang et al. |
| 2008/0261519 A1 | 10/2008 | DeMarco et al. |
| 2009/0054008 A1 | 2/2009 | Satou |
| 2009/0121797 A1 * | 5/2009 | Karabatsos ............... G06F 1/08 331/57 |
| 2009/0125253 A1 * | 5/2009 | Blair et al. ................ 702/57 |
| 2009/0252252 A1 | 10/2009 | Kim et al. |
| 2009/0289744 A1 | 11/2009 | Miyashiro |
| 2010/0002620 A1 | 1/2010 | Proctor, Jr. et al. |
| 2010/0127795 A1 | 5/2010 | Bauer et al. |
| 2010/0134700 A1 | 6/2010 | Robert et al. |
| 2010/0148886 A1 | 6/2010 | Inoue et al. |
| 2010/0177917 A1 * | 7/2010 | Van Der Werf ............. 381/318 |
| 2010/0323654 A1 | 12/2010 | Judson et al. |
| 2011/0069644 A1 | 3/2011 | Kim et al. |
| 2011/0080229 A1 | 4/2011 | Kennington |
| 2011/0080856 A1 | 4/2011 | Kenington |
| 2011/0134810 A1 * | 6/2011 | Yamamoto et al. .......... 370/278 |
| 2011/0140803 A1 | 6/2011 | Kim et al. |
| 2011/0227664 A1 * | 9/2011 | Wyville .................... 333/17.1 |
| 2012/0007605 A1 | 1/2012 | Benedikt |
| 2012/0063496 A1 | 3/2012 | Giannini et al. |
| 2012/0140860 A1 | 6/2012 | Rimini et al. |
| 2012/0154071 A1 | 6/2012 | Bradley et al. |
| 2012/0163245 A1 | 6/2012 | Tone et al. |
| 2012/0194269 A1 * | 8/2012 | Schlager ................ H03F 11/00 330/112 |
| 2012/0201153 A1 | 8/2012 | Bharadia et al. |
| 2012/0201173 A1 | 8/2012 | Jain et al. |
| 2012/0212304 A1 | 8/2012 | Zhang et al. |
| 2012/0230227 A1 | 9/2012 | Weiss |
| 2013/0016634 A1 | 1/2013 | Smiley |
| 2013/0063299 A1 * | 3/2013 | Proudkii ..................... 342/188 |
| 2013/0083703 A1 | 4/2013 | Granger-Jones et al. |
| 2013/0109330 A1 * | 5/2013 | Sahota et al. ................. 455/77 |
| 2013/0113576 A1 | 5/2013 | Inoue et al. |
| 2013/0130619 A1 | 5/2013 | Harverson et al. |
| 2013/0154887 A1 * | 6/2013 | Hein et al. .................... 343/703 |
| 2013/0201880 A1 | 8/2013 | Bauder et al. |
| 2013/0201881 A1 | 8/2013 | Bauder et al. |
| 2013/0201882 A1 | 8/2013 | Bauder et al. |
| 2013/0241655 A1 | 9/2013 | Liss et al. |
| 2013/0241669 A1 | 9/2013 | Mikhemar et al. |
| 2013/0242809 A1 | 9/2013 | Tone et al. |
| 2013/0321097 A1 | 12/2013 | Khlat et al. |
| 2014/0169236 A1 | 6/2014 | Choi et al. |
| 2014/0194073 A1 | 7/2014 | Wyville et al. |
| 2014/0204808 A1 | 7/2014 | Choi et al. |
| 2015/0118978 A1 | 4/2015 | Khlat |
| 2015/0163044 A1 | 6/2015 | Analui et al. |

FOREIGN PATENT DOCUMENTS

| | | |
|---|---|---|
| EP | 2733855 A1 | 5/2014 |
| EP | 2960981 A1 | 12/2015 |
| WO | WO 95/15018 A1 | 6/1995 |
| WO | WO2014032883 A1 | 3/2014 |
| WO | WO2014133625 A2 | 9/2014 |
| WO | WO2015089092 A1 | 6/2015 |

OTHER PUBLICATIONS

Kannangara, S. et al. 2007. Analysis of an Adaptive Wideband Duplexer With Double-Loop Cancellation. IEEE Transactions on Vehicular Technology, vol. 56, No. 4, pp. 1761-1982, Jul. 2007.

Hunter, I.C. et al. 2005. Passive Microwave Receive Filter Networks Using Low-Q Resonators. IEEE Microwave Magazine, Sep. 2005, pp. 46-53.

Laforge, P.D. et al. 2009. Diplexer design implementing highly miniaturized multilayer superconducting hybrids and filters. IEEE Transactions on Applied Superconductivity, Apr. 2009, pp. 47-54.

Marcatili, E.A. et al. 1961. Band-Splitting Filter. Bell System Technical Journal, Jan. 1961, pp. 197-212.

Matthaei, G. et al. 1980. Microwave Filters, Impedance-Matching Networks, and Coupling Structures, Chapter 14: Directional, Channel-Separation Filters and Traveling-Wave Ring-Resonators, pp. 843-888; Chapter 16: Multiplexer Design, pp. 965-1000. Copyright 1980 Artech House, Inc., Dedham, MA; reprint of edition published by McGraw-Hill Book Company, Inc., 1964.

Phudpong, P. et al. 2007. Nonlinear Matched Reflection Mode Bandstop Filters for Frequency Selective Limiting Applications. In Microwave Symposium Conference, 2007, IEEE/MTT-S International, 2007, pp. 1043-1046.

United States International Searching Authority (ISA/US). 2015. International Search Report and Written Opinion of the International Searching Authority, mailed Mar. 3, 2015, for PCT Application PCT/US069372, entitled "Enhancing Isolation and Impedance Matching in Hybrid-Based Cancellation Networks and Duplexers," filed Dec. 9, 2014.

United States International Searching Authority (ISA/US). 2015. International Search Report and Written Opinion of the International Searching Authority, mailed May 20, 2015, for PCT Application PCT/US2015/016145, entitled "Hybrid-Based Cancellation in Presence of Antenna Mismatch," filed Feb. 17, 2015.

United States International Searching Authority (ISA/US). 2015. International Search Report and Written Opinion of the International Searching Authority, mailed May 27, 2015, for PCT Application PCT/US2015/015930, entitled "Reflection and Hybrid Reflection Filters," filed Feb. 13, 2015.

United States International Searching Authority (ISA/US). 2015. International Search Report and Written Opinion of the International Searching Authority, mailed Jun. 25, 2015, for PCT Application PCT/US2015/016642, entitled "Miniature Acoustic Resona-

(56) References Cited

OTHER PUBLICATIONS tor-Based Filters and Duplexers with Cancellation Methodology," filed Feb. 19, 2015.

USPTO. 2015. Office Action, dated Jul. 29, 2015 for U.S. Appl. No. 14/626,572, entitled "Miniature Acoustic Resonator Based Filters and Duplexers with Cancellation Methodology," filed Feb. 19, 2015.

USPTO. 2016. Final Office Action, dated Mar. 31, 2016, for U.S. Appl. No. 14/626,572, entitled "Miniature Acoustic Resonator Based Filters and Duplexers with Cancellation Methodology," filed Feb. 19, 2015.

USPTO. 2016. Non-final Office Action, dated Jul. 15, 2016, for U.S. Appl. No. 14/626,572, entitled "Miniature Acoustic Resonator-Based Filters and Duplexers with Cancellation Methodology."

USPTO. 2016. Non-final Office Action, dated May 20, 2016, for U.S. Appl. No. 14/622,627, entitled "Reflection and Hybrid Reflection Filters."

European Patent Office (EPO). 2016. Extended European Search Report, dated Jul. 4, 2016, for European Application No. 13876497.2, entitled "Passive Leakage Cancellation Networks for Duplexers and Coexisting Wireless Communication Systems" (European counterpart to instant application).

\* cited by examiner

… … …

PASSIVE LEAKAGE CANCELLATION NETWORKS FOR DUPLEXERS AND COEXISTING WIRELESS COMMUNICATION SYSTEMS

CROSS-REFERENCE TO RELATED APPLICATIONS

This application is based upon and claims priority to U.S. provisional patent application 61/735,783, entitled "FRONT-END MODULES FOR FULL-DUPLEX WIRELESS TRANSCEIVERS," filed Dec. 11, 2012. This application is also based upon and claims priority to U.S. provisional patent application 61/805,078, entitled "FRONT-END MODULES FOR FULL-DUPLEX WIRELESS TRANSCEIVERS," filed Mar. 25, 2013. The entire content of each of these applications is incorporated herein by reference.

STATEMENT REGARDING FEDERALLY SPONSORED RESEARCH

This invention was made with government support under Grant No. N00014-12-V-0130, awarded by the Office of Naval Research (ONR), and under Grant No. HR0011-12-C-0094, awarded by the Defense Advanced Research Projects Agency (DARPA). The government has certain rights in the invention.

BACKGROUND

1. Technical Field

This disclosure relates to wireless communication systems that transmit and receive at the same time, as well as to leakage of the transmitted signal into the received signal in such systems.

2. Description of Related Art

In wireless communication systems, a wireless receiver (RX) may receive a signal while a wireless transmitter (TX)—which may be collocated, co-site, or in close vicinity—may simultaneously transmit a different signal. For example, in a frequency division duplex (FDD) radio communication system, the TX and the RX of the same radio may operate simultaneously in two different frequency bands, $f_{tx}$ for TX and $f_{rx}$ for RX, respectively. Another example is a smart phone that has multiple radios, such as a Wi-Fi radio and cellular radio, that may operate simultaneously. This may result in the RX of one radio receiving a signal in one frequency band $f_{rx}$, while the TX of the other radio is transmitting a signal in another frequency band $f_{INT}$.

In such scenarios, an important performance metric for the radio communication system may be the "isolation" between the TX and the RX that are operating simultaneously. The isolation can be particularly important within the TX frequency band and within the RX frequency band. Any leakage that reaches RX within the TX frequency band or the RX frequency band may interfere significantly with the receiver. The minimum required isolation may depend on the application and the scenario. For example, in a commercial FDD radio, TX to RX isolation of 50 dB or more may be required in the TX and the RX frequency bands. Without adequate isolation, the aggressor TX signal may significantly deteriorate the sensitivity of the victim RX and ultimately prevent its proper operation.

In FDD radios, a popular approach to providing TX-RX isolation is to use a frequency duplexer. The duplexer is a three port electrical network. One port is typically connected to the antenna (ANT), one port is connected to the TX output, and one port is connected to the RX input. A common challenge in duplexer design is to achieve low insertion loss from TX to ANT and from ANT to RX, while providing high isolation from TX to RX. However, meeting this requirement may require costly resonator technologies, such as Bulk Acoustic Wave (BAW) resonators. In addition, with emerging growth in the number of frequency bands that an FDD radio may need to support, the number of duplexers in a radio may grow proportionally, which may result in a complex, non-scalable radio system. Consequently, a tunable duplexer that can be electronically tuned to address more than one band can be extremely desirable to reduce the complexity and cost of the radios. However, acoustic resonators can be difficult to tune, while other types of tunable resonators may not provide sufficient isolation without significant losses and/or without undue bulk.

Isolation of aggressor TX and victim RX has also used a combination of separation in frequency domain and customized filtering. The isolation is typically tied to a specific platform and frequency band of the radio it supports, which can be limiting as the radios become more complex and support more bands.

Another approach to enhancing isolation between TX and RX is to generate a cancellation signal that fully or partially matches the amplitude of the leakage signal from the aggressor TX to the victim RX, but with the opposite phase. The cancellation signal is then combined with the leakage signal to cancel it out and enhance isolation.

This cancellation method may require an active circuit, such as an amplifier, in the path that creates the cancellation signal to match the leakage signal. Introduction of an active circuit can be extremely undesirable because it can introduce excess noise, limit power handling due to nonlinearity, and/or consumes power. Furthermore, such an approach may cancel the leakage signal downstream of the signal path in the victim RX. This may require the up-stream signal path of the victim RX to be linear which, in turn, may impose a limit on the RF power handling capability of the system. If the combination with leakage signal is achieved in a feedback cancellation, moreover, a significant stability requirement may also need to be accounted for.

There is a class of radio communication systems, where the TX and RX operate simultaneously at the same band, also sometimes referred to as the same channel. In such scenarios, there may not be any frequency separation between RX and TX. Therefore, TX-RX isolation may not be achieved with any bandpass filtering or similar circuits. Proper operation of RX may then largely depend on the cancellation of the self-interfering TX signal of the same radio. Depending on the required sensitivity for the RX and the output signal power of the TX, total isolation of 100 dB to 130 dB may be required. Such high level of isolation may be difficult to achieve with one cancellation step at the radio front-end. Furthermore, additional filtering may be necessary to filter other interfering signals arriving at the RX in other frequency bands.

SUMMARY

A passive cancellation network may include a transmit input having a configuration that passively receives a transmit signal from a transmitter that is to be wirelessly transmitted; a transmit output having a configuration that passively delivers the transmit signal after processing by the passive cancellation network; a receive input having a configuration that passively receives a receive signal that includes undesirable leakage from the transmit signal; a receive output having a configuration that passively delivers the receive signal after processing by the passive cancellation network; and a passive feed forward cancellation circuit that passively cancels at least a portion of the undesired leakage from the transmit signal in the receive signal in a feed forward manner.

The transmit output and the receive input may share a common terminal.

The passive feed forward cancellation circuit may include a passive duplexer.

A portion of the transmit signal may be within a transmit frequency band, a portion of the receive signal may be within a receive frequency band that is different from the transmit frequency band, the undesirable leakage may be in the transmit frequency band, the receive frequency band, or both, and the passive feed forward cancellation circuit may include: a first passive cancellation sub-circuit that has a configuration that cancels at least a portion of the undesirable leakage in the transmit frequency band; or a second passive cancellation sub-circuit that has a configuration that cancels at least a portion of the undesirable leakage in the receive frequency band.

The first passive cancellation sub-circuit may have a high input impedance to signals within the receive frequency band. The second passive cancellation sub-circuit may have a high input impedance to signals within the transmit frequency band.

The first passive cancellation sub-circuit may include a first passive bandpass filter that substantially passes signals only within the transmit frequency band. The second passive cancellation sub-circuit may include a second passive bandpass filter that substantially passes signals only within the receive frequency band.

The passive cancellation network may include a passive duplexer that includes: a third passive bandpass filter that substantially passes signals only within the transmit frequency band; or a fourth passive bandpass filter that substantially passes signals only within the receive frequency band. The first and third passive bandpass filters may have substantially the same orders, losses, or out of band responses. The second and fourth passive bandpass filters may have substantially the same orders, losses, or out of band responses. The first passive bandpass filter may have a substantially flat amplitude response in the receive frequency band. The second passive bandpass filter may have a substantially flat amplitude response in the transmit frequency band.

The transmit or the receive signal or both may have signals in multiple non-contiguous frequency bands. The cancellation by the passive feed forward cancellation circuit of leakage from the transmit signal may be optimum within one or more of the multiple non-contiguous frequency bands.

The passive feed forward cancellation circuit may include a passive signal combiner and a passive signal splitter.

The passive feed forward cancellation circuit may include a passive attenuator, phase shifter, or delay line.

The passive feed forward cancellation circuit may include a passive voltage combiner, power combiner, or directional coupler.

The passive feed forward cancellation circuit may include a passive tunable circuit that controls the frequency band or bands in which cancellation of undesirable leakage is optimum.

The passive feed forward cancellation circuit may include a passive tunable circuit that enables the passive feed forward cancellation circuit to be tuned to the transmit frequency band, the receive frequency band, or both.

The passive feed forward cancellation circuit may include a circulator.

The passive feed forward cancellation circuit may include an isolator.

The passive feed forward cancellation circuit may include a circuit containing an algorithm that has a configuration that optimizes the passive feed forward cancellation circuit to maximize cancellation of the undesirable leakage based on signal at the transmit input.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

A variety of innovative systems, architectures, and methodologies for passive feed-forward cancellation and its application to frequency duplexers and coexisting wireless communication systems will now be described.

The components and circuits that are now discussed may all be passive. A passive component or circuit is one that does not provide any power gain. Such passive components and circuits may include one or more resistors, capacitors, inductors, resonators, acoustic resonators, coils, transformers, baluns, or distributed elements, such as transmission lines, coaxial resonators, or any combination of these. The passive components and circuits may also include switches. Transistors that do not provide any power gain may be used for switches and are also then considered to be passive.

Using passive components may enhance the degree of leakage cancellation without creating degrading noise or nonlinearities and without requiring external power.

Figure 1:
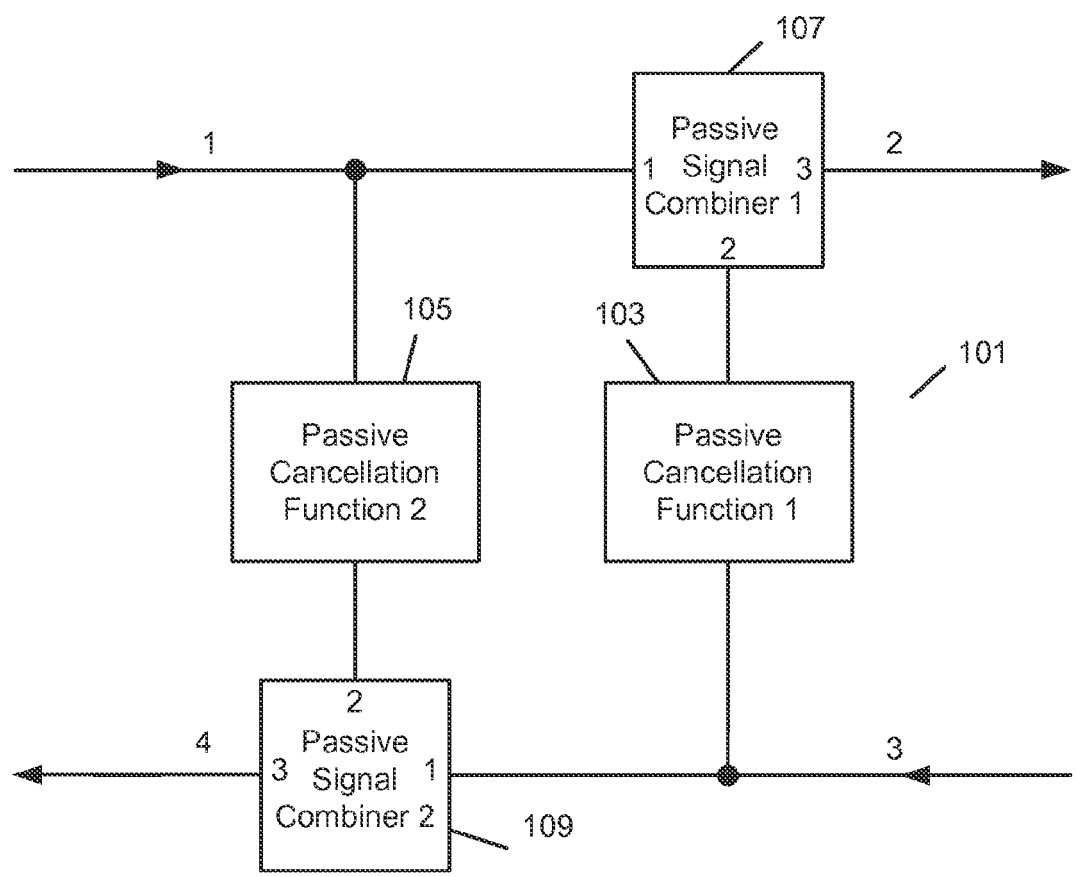
FIG. 1 illustrates an example of a passive cancellation network.

FIG. 1 illustrates an example of a passive cancellation network. The passive cancellation network may be a four port electrical network, such as with ports 1-4 as marked in FIG. 1. The network may be used in a radio system with one or more radios, where RX of one radio is a victim to an aggressor transmitter (TX) of the same or another radio.

Port 1 may receive a signal that is to be provided to an RX. The receive signal may be in a specific frequency band, the RX frequency band.

Port 2 may output the RX signal after cancellation processing.

Port 3 may receive the TX signal or its copy from the aggressor source. The transmit signal may be within a specific frequency band, the TX frequency band.

Port 4 may output the aggressor TX signal after cancellation processing.

In the absence of the passive cancellation network, there may be significant leakage from TX to RX, degrading the victim RX performance. An example leakage path is when signal leaks from the antenna of the aggressor radio to the antenna of the victim radio, in a coexistence scenario. The passive cancellation network may be inserted into the radio system. It may include two passive cancellation function circuits 103 and 105, and two signal combiners 107 and 109. The passive cancellation network 101 and all its components may be entirely passive and have a reciprocal transfer function. For example, the signal combiner 107 may be a three port passive network that has a reciprocal response.

The signal loss from its port 1 to its port 2 and from its port 3 to its port 4 may be minimal. Therefore, insertion of the passive cancellation network may not create significant signal insertion loss in the radio system.

The passive cancellation function circuits 103, and 105 may be designed such that the transfer function from port 3 to port 2 of the passive cancellation network matches, as close as possible, the leakage transfer function from TX to RX, with opposite phase. Therefore, the passive cancellation network may fully or partially cancel the leakage signal from TX to RX and may enhance the overall isolation. For example, overall isolation of at least 40, 50, or 60 dB may be achieved. The inclusion of both passive cancellation function circuits 103 and 105 may enable the passive cancellation network to enhance the overall isolation in both the RX frequency band and the TX frequency band, which are typically important frequency bands where isolation is important. The passive cancellation function circuit 103 combined with the signal combiner 107 may be configured to enhance isolation in the RX frequency band, while the passive cancellation function circuit 105 combined with the signal combiner 109 may be configured to enhance isolation in the TX frequency band.

The two passive cancellation function circuits 103 and 105 and two signal combiners 107 and 109 may have one or more of the following properties:

Each of the signal combiners 107 and 109 may combine signals from its ports 1 and 2 and output the combined signal to its port 3. Signal loss from port 1 to port 3 of each combiner may be minimal.

Passive cancellation function circuit 103 may have a passive transfer function with high input impedance at RX band and may be adjusted in amplitude and phase to create a cancellation signal at its output, which when combined with a leakage signal, may fully or partially cancel the leakage across the whole or a portion of frequency band.

Passive cancellation function circuit 105 may have a passive transfer function with high input impedance at TX band and may be adjusted in amplitude and phase to create a cancellation signal at its output, which when combined with a leakage signal may fully or partially cancel the leakage across the whole or a portion of frequency band.

Figure 2:
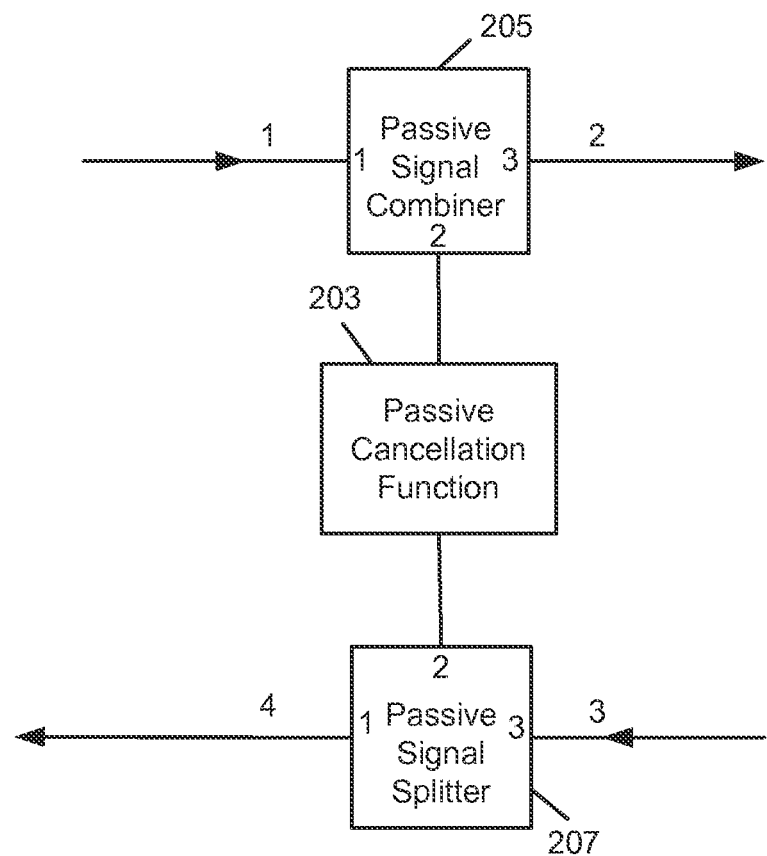
FIG. 2 illustrates an example of another passive cancellation.

FIG. 2 illustrates an example of another passive cancellation. The passive cancellation network may again be a four port electrical network with ports 1-4 as shown in FIG. 2. It may be used in a radio system with one or more radios, where RX of one radio is a victim to an aggressor transmitter (TX) of the same or another radio.

Port 1 may receive the signal that is to be provided to RX.

Port 2 may output the RX signal after cancellation processing.

Port 3 may receive the TX signal or its copy from the aggressor source.

Port 4 may output the aggressor TX signal after cancellation processing.

In the absence of the passive cancellation network, there may be significant leakage from TX to RX, degrading the victim RX performance. An example leakage path is when signal leaks from the antenna of the aggressor radio to the antenna of the victim radio, in a coexistence scenario. The passive cancellation network may then be inserted in the radio system.

The passive cancellation network may include the passive cancellation function circuit 203, a signal combiner 205, and a signal splitter 207. All of the components in the passive cancellation network may be passive and consequently have a reciprocal transfer function. For example, the signal combiner 205 may be a three port passive network that has a reciprocal response. The signal loss from port 1 to port 2 and from port 3 to port 4 may be minimal. Therefore, insertion of the passive cancellation network may not significantly degrade the signal insertion loss of the original radio system. The passive cancellation function circuit 203 may be designed such that the transfer function from port 3 to port 2 of the passive cancellation network matches, as close as possible, the leakage transfer function from TX to RX, with opposite phase. Therefore, the passive cancellation network may fully or partially cancel the leakage signal from TX to RX and enhance the overall isolation. For example, overall isolation of at least 40, 50, or 60 dB may be achieved.

The passive cancellation network may include the passive cancellation function circuit 203, a passive signal combiner 205, and a passive signal splitter 207, and may have one or more of the following properties:

The signal splitter 207 may split signal from its port 3 to two signals and output them to its ports 1 and 2. Signal loss from its port 3 to its port 1 may be minimal.

The signal combiner 205 may combine signals from its ports 1 and 2 and output the combined signal to its port 3. Signal loss from port 1 to port 3 may be minimal.

The passive cancellation function circuit may have a passive transfer function that can be adjusted in amplitude and phase to create a cancellation signal at its output which, when combined with the leakage signal, may fully or partially cancel the leakage.

Figure 3:
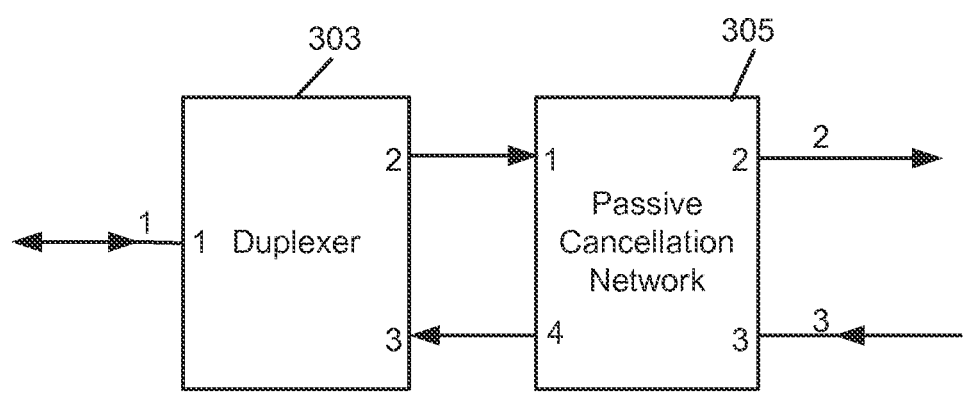
FIG. 3 illustrates an example of a passive cancellation-based duplexer that includes a duplexer and a passive cancellation network.

FIG. 3 illustrates an example of a passive cancellation-based duplexer that includes a duplexer 303 and a passive cancellation network 305. The passive cancellation network 305 may be of any type, such as the passive cancellation networks shown in FIG. 1 or 2. The aggressor TX and the victim RX may belong to the same FDD radio and require high TX to RX isolation, such as at least 40, 50, or 60 dB. The passive cancellation-based duplexer may have ports 1-3 as shown in FIG. 3. Port 1 may receive RX signal and transmit TX signals and may be connected to an antenna or an antenna switch. Port 2 may output an RX signal and may be connected to a receiver input. Port 3 may input a TX signal and may be connected to a transmitter output. The signal loss from port 1 to port 2 and from port 3 to port 1 may be minimal. The isolation from port 3 to port 2 may be high.

The duplexer 303 may be a conventional duplexer 303 that may have poor isolation between its ports 2 and port 3, such as isolation that is less than 40, 30, or 20 dB. The passive cancellation-based duplexer may contain other passive components. The passive cancellation-based duplexer may enhance isolation between ports 2 and 3 of the overall architecture. Therefore, the passive cancellation-based duplexer may become a superior duplexer with superior isolation between its ports 2 and 3. The passive cancellation-based duplexer 301 may be used with a conventional duplexer 303 that has poor isolation between its ports 2 and 3 to enable very low signal loss between its ports 1 to 2 and ports 3 to 1. The signal loss from ports 1 to 2 and ports 3 to 1 of the passive cancellation-based duplexer may follow those of the conventional duplexer 303. The passive cancellation network 505 may enhance the isolation such that the overall isolation between ports 2 and 3 of the passive cancellation-based duplexer is superior. The passive cancellation network 305 may not have any considerable impact on signal loss from port 1 to port 2 and from port 3 to port 1 of the passive cancellation-based duplexer. As a result, the passive cancellation-based duplexer may become a duplexer with both superior loss and superior isolation, as compared to conventional duplexers, such as the conventional duplexer 303.

The passive cancellation-based duplexer may have one or more of the following properties:
The passive cancellation network 305 may enhance isolation from port 3 to port 2
The conventional duplexer 303 may provide a passive function with the following characteristics:
Minimal signal loss from its port 1 to its port 2 at RX band
Minimal signal loss from its port 3 to its port 1 at TX band
Isolation from its port 3 to its port 2

Figure 4:
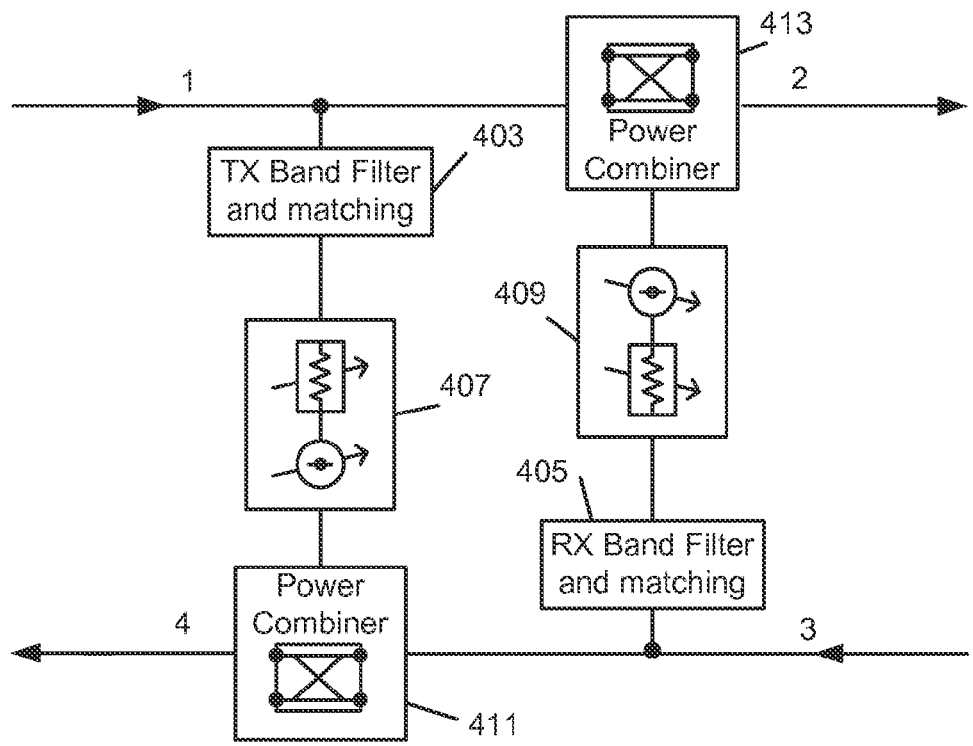
FIG. 4 illustrates another example of a passive cancellation network.

FIG. 4 illustrates another example of a passive cancellation network. The passive cancellation network may include:
A passive TX band bandpass filter and impedance matching network 403.
A passive RX band bandpass filter and impedance matching network 405.
A passive cancellation network 407 which may contain adjustable attenuators and phase shifters
A second passive cancellation network 409 which may contain adjustable attenuators and phase shifters
A passive signal combiner 411 which may be a power combiner, e.g. a directional coupler.
A second passive signal combiner 413 which may be a power combiner, e.g. a directional coupler.

Figure 5:
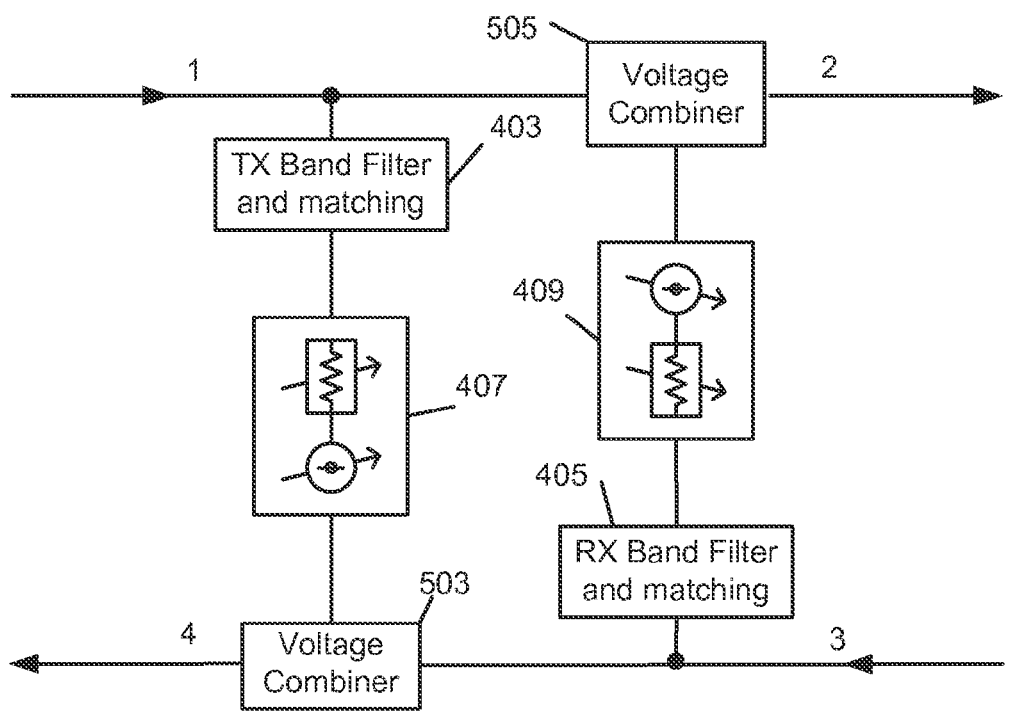
FIG. 5 illustrates another example of a passive cancellation network.

FIG. 5 illustrates another example of a passive cancellation network. The passive cancellation network may include:
The passive TX band bandpass filter and impedance matching network 403.
The passive RX band bandpass filter and impedance matching network 405.
The passive cancellation network 407 which may contain adjustable attenuators and phase shifters.
The second passive cancellation network 409 which may contain adjustable attenuators and phase shifters.
A passive signal combiner 503 which may be a voltage combiner, e.g. a transformer or a balun.
A passive signal combiner 505 which may be a voltage combiner, e.g. a transformer or a balun.

The passive cancellation networks shown in FIGS. 4 and 5 may achieve almost an infinite amount of cancellation at one frequency in connection with each of the passive cancellation networks 407 and 409. The cancellation at other frequencies in the TX band or the RX band may depend on how well the cancellation path transfer function matches the leakage path transfer function.

Figure 6:
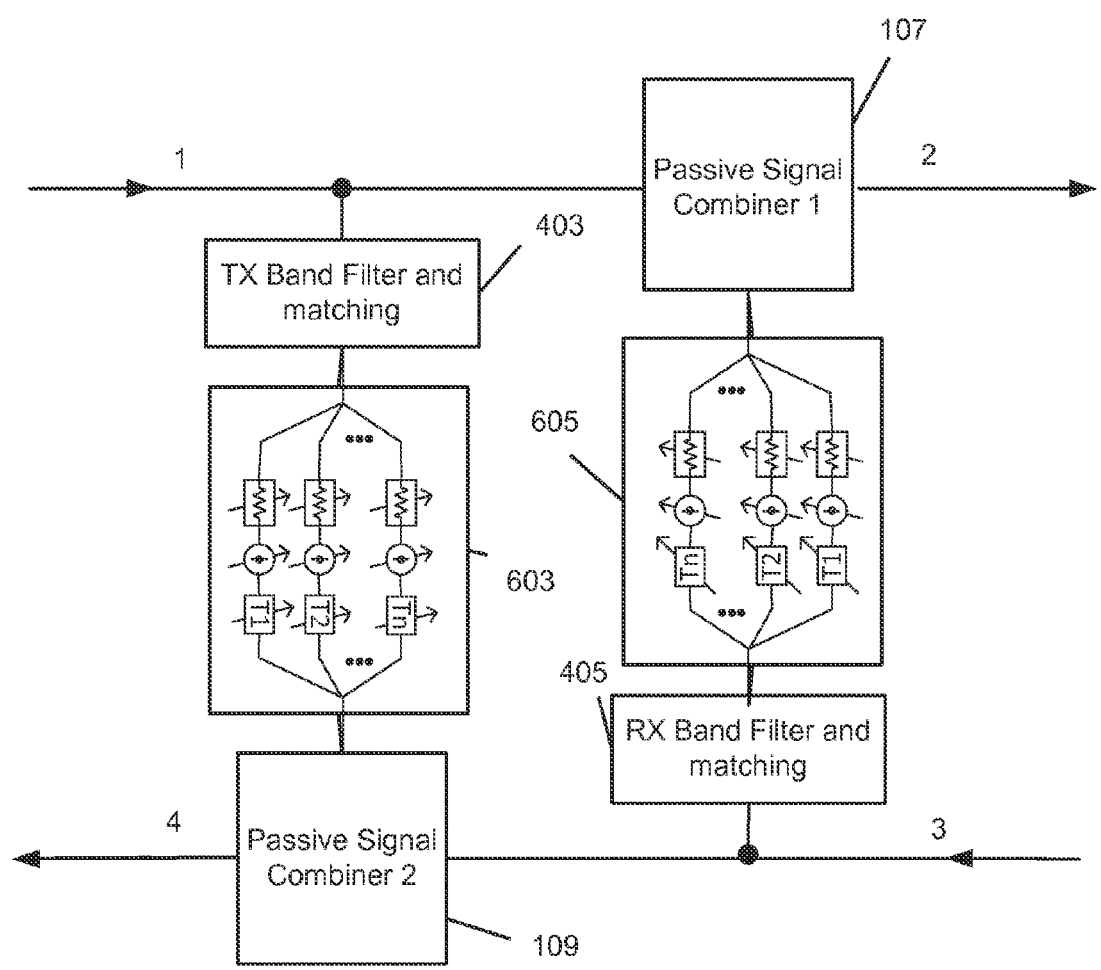
FIG. 6 illustrates an example of a passive cancellation networks that may achieve near infinite amount of cancellation at multiple frequencies.

FIG. 6 illustrates an example of a passive cancellation networks that may achieve near infinite amount of cancellation at multiple frequencies. The passive cancellation network may include:
The passive TX band bandpass filter and impedance matching network.
The passive RX band bandpass filter and impedance matching network 405.
A passive cancellation network 603 which may contain signal splitters, combiners, adjustable attenuators, phase shifters, and adjustable delay lines.
A second passive cancellation network 605 which may contain signal splitters, combiners, adjustable attenuators, phase shifters, and adjustable delay lines.
The passive signal combiner 107 which may be a voltage or power combiner, e.g. a coupler, a transformer or a balun.
The passive signal combiner that may be a voltage or power combiner, e.g. a coupler, a transformer, or a balun.

Figure 7:
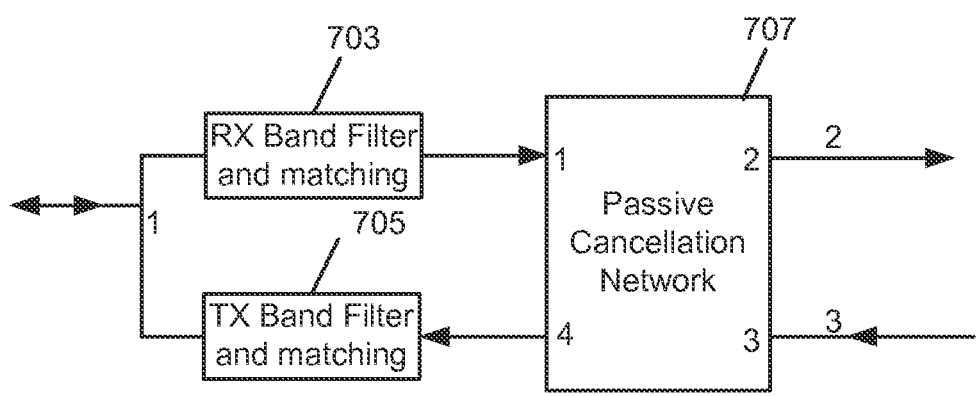
FIG. 7 is another example of a passive cancellation-based duplexer.

FIG. 7 is another example of a passive cancellation-based duplexer. The passive cancellation duplexer may include:
A passive TX band bandpass filter and impedance matching network 705.
A passive RX band bandpass filter and impedance matching network 703.
A passive cancellation network 707, which may be any of the passive cancellation networks illustrated in FIG. 1 or 3-6.

If the passive cancellation-based duplexer uses any of the passive cancellation networks illustrated in FIGS. 4-6, the bandpass filters 403 and 405 may have a response that fully or partially match the response of the filters 703 and 705, respectively. Specifically, the bandpass filter 403 may be same as bandpass filter 703, and the bandpass filter 405 may be same as bandpass filter 705.

Figure 8:
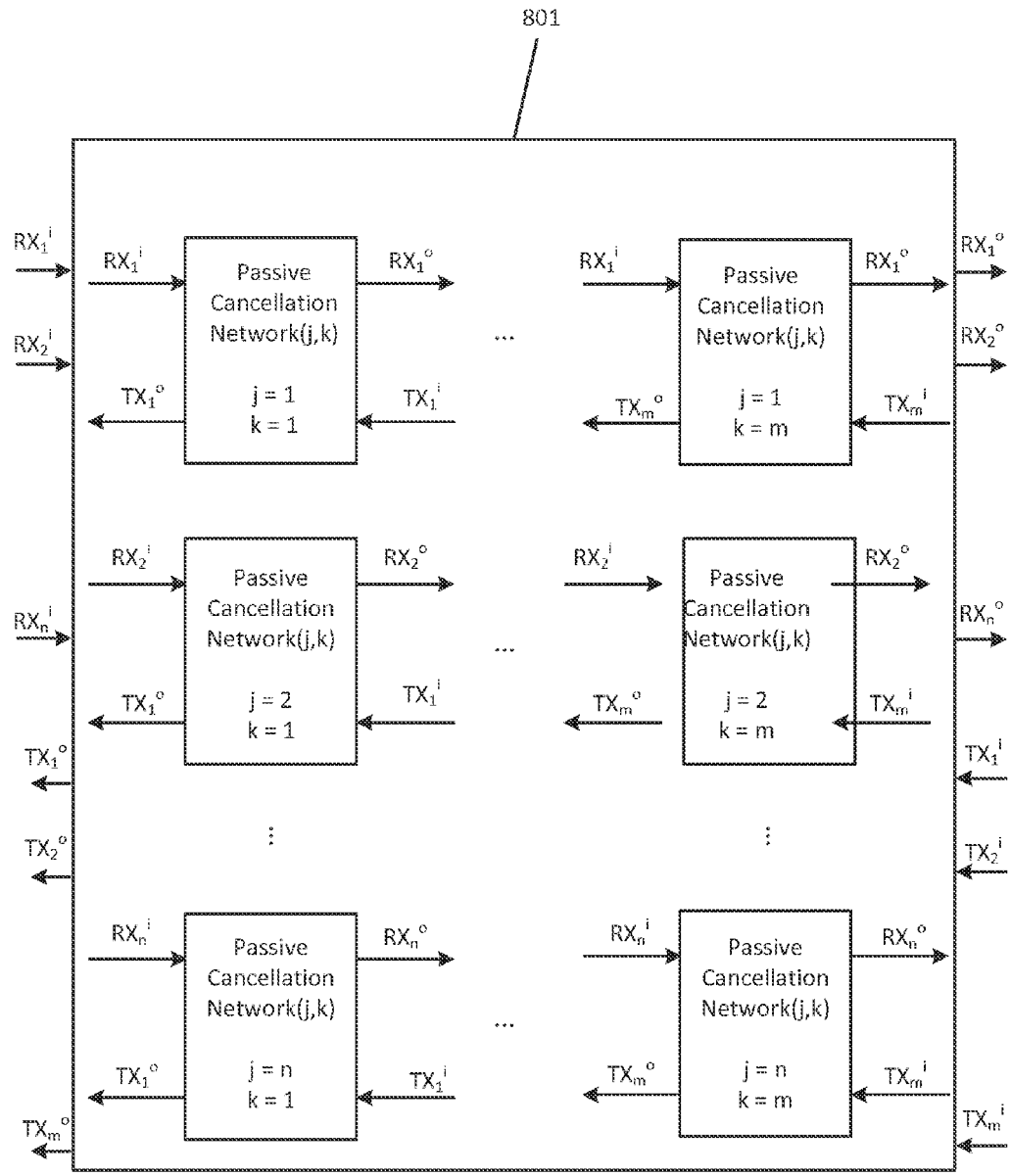
FIG. 8 illustrates an example of a passive cancellation network that services a radio system that has "n" victim receivers and "m" aggressor transmitters, where "m" and "n" are each a natural integer larger than or equal to one.

FIG. 8 illustrates an example of a passive cancellation network that services a radio system that has "n" victim receivers and "m" aggressor transmitters, where "m" and "n" are each a natural integer larger than or equal to one. The passive cancellation network may be a "2(m+n)" port electrical network. Port 1 to port n may receive the signals $RX_1^i$ to $RX_n^i$ that are to be provided to the victim receivers of the radio. Port n+1 to port 2n may output the RX signals $RX_1^o$ to $RX_n^o$ after cancellation processing. Port 2n+1 to port 2n+m may receive the TX signals from the aggressor sources $TX_1^i$ to $TX_m^i$. Port 2n+m+1 to port 2(m+n) may output the aggressor TX signals $TX_1^o$ to $TX_m^o$ after cancellation processing.

The passive cancellation network may contain "m.n" 4-port passive cancellation networks which each could be any of the 4-port passive cancellation networks shown in FIG. 1 or 3-6. Each of the 4-port passive cancellation networks may enhance isolation from one of the "m" aggressor TX signals to one of the "n" victim RX signals. The passive cancellation network shown in FIG. 8 may be used for enhancing isolation of coexisting multiple radios. The passive cancellation network may also be combined with one or multiple duplexers for isolation enhancement of single channel, multi-band, channel aggregated, single antenna, multi-antenna, or any combination of the above radio systems.

All proposed passive cancellation networks and passive cancellation-based duplexers may be associated with a cancellation band and a cancellation bandwidth. The cancellation band may be defined as the frequency band over which the overall isolation between RX and TX is better than a specified value, such as 40, 50 or 60 dB. The cancellation band may be of a single frequency band or multiple contiguous or non-contiguous bands, depending on the transfer functions inside the passive cancellation network. Consequently, passive cancellation networks and passive cancellation-based duplexers with narrowband, wide-band, and concurrent multi-band passive cancellation may be achieved. In addition, the passive cancellation networks and the passive cancellation-based duplexers may each have a cancellation band that is tunable. The tunability of cancellation profile, e.g. the tunability of the cancellation band, may be achieved by adjusting appropriate parameters of the passive networks, such as the attenuation of the attenuators or phase of the phase shifters in the passive cancellation networks 407, 409, 603, or 605.

One extension of all the foregoing, also referred to as fixed frequency band cancellation or fixed frequency duplexers is a class of "tunable" passive cancellation networks and "tunable" passive cancellation-based duplexers. Tunable duplexers or tunable passive cancellation networks may be duplexers or passive cancellation networks whose RX band ($f_{rx}$) and/or TX band ($f_{tx}$) may be variable or may be tuned. The passive cancellation networks shown in FIGS. 1-8, as well as the passive cancellation-based duplexers shown in FIGS. 3 and 7 may each be made tunable, when few or all the passive components in each include a tuning capability. Any parameters of the duplexers or passive cancellation networks may be tuned, e.g. the duplexer center frequency or bandwidth in each of RX or TX frequency bands.

For example, when the TX band filters 703 and 403 are embodied as tunable filters, a passive cancellation-based duplexer with tunable TX band may be achieved. Similarly, when the RX band filters 705 and 405 tunable filters, a passive cancellation-based tunable duplexer with tunable RX band may be achieved. The two can also be combined.

Figure 13:
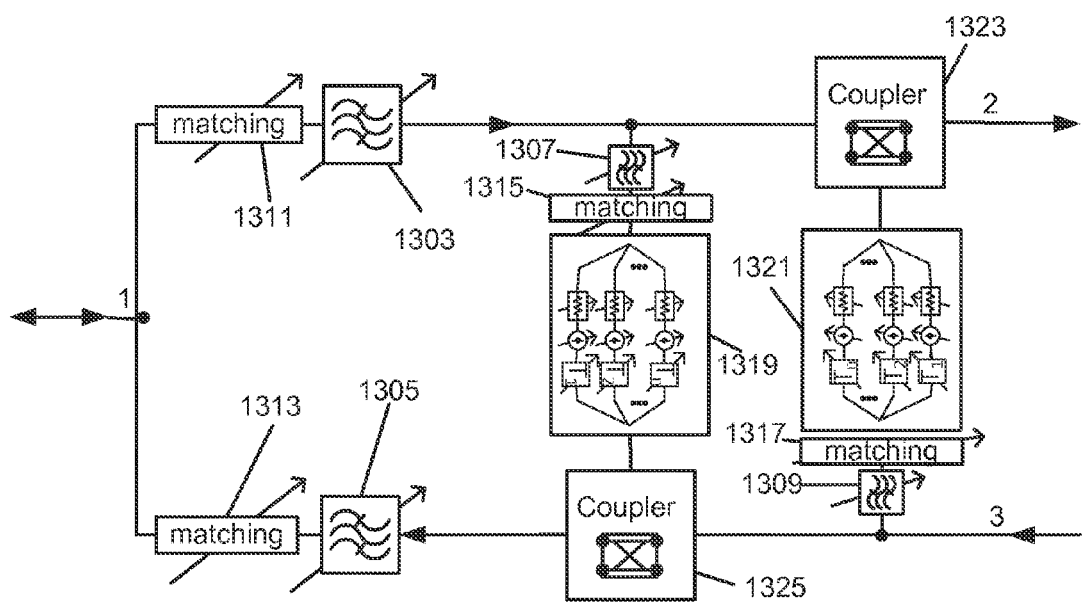
FIG. 13 illustrates an example of a passive cancellation-based tunable duplexer.

FIG. 13 illustrates an example of a passive cancellation-based tunable duplexer that may include:
A TX band tunable bandpass filter 1305.
A RX band tunable bandpass filter 1303.
Tunable matching networks 1311 and 1313.
A TX band tunable bandpass filter 1307.
An RX band tunable bandpass filter 1309.
Tunable matching networks 1315 and 1317.
A tunable passive cancellation network 1319, which may contain signal splitters and combiners, multiple adjustable attenuators and phase shifters, and adjustable delay lines, any or all of which, may be tunable.
A second tunable passive cancellation network 1321, which may contain signal splitters and combiners, multiple adjustable attenuators and phase shifters, and adjustable delay lines, any or all of which may be tunable.
A passive signal combiner 1323, which may be a voltage or power combiner, e.g. a directional coupler, a transformer or a balun.
A second passive signal combiner 1325, which may be a voltage or power combiner, e.g. a directional coupler, a transformer or a balun.

The tunable filters 1303, and 1305, together with the matching networks 1311 and 1313, may form the tunable duplexer, an example embodiment of the conventional duplexer 303. The filters 1303 and 1309 may have fully or partially matching responses. Specifically they may be the same filters. The filters 1305 and 1307 may have fully or partially matching responses. Specifically they may be the same filters.

Existing or new device and component technologies and their combinations may be used to implement the passive blocks in the passive cancellation networks and passive cancellation-based duplexers that have been discussed. Examples include: acoustic resonator-based technologies, electromagnetic resonator-based technologies, integrated passive device technologies, surface mounted component passive technologies, integrated switch technologies, tunable MEMS capacitor technologies, tunable BST capacitor technologies, tunable SOI capacitor, tunable SOS capacitor, or tunable CMOS capacitor technologies, and circulator or isolator based technologies. While not all technologies are possible for all architectures, many combinations are.

Specifically, any of the passive cancellation function circuits 103, 105, or 203, or conventional duplexer 303 may use, as part of its construction, a filter transfer function. The filter transfer functions can be implemented by various methods of combining fixed and tunable or switched elements, including using lumped passive components that may be discrete, or integrated in a silicon chip, or embedded in a Printed Circuit Board (PCB) substrate or package. They can also be implemented using lower-Q electrical resonators realized on either of a PCB, silicon chip, package, or other electromagnetic type resonators such as ceramic or other dielectric resonators. In addition, resonators may be based on mechanical or acoustic resonators, including MEMs, SAW, and BAW types. The tunable components can be MEMS tunable capacitors as well as digitally tunable capacitors in silicon or silicon or insulator (SOI) or silicon on sapphire (SOS), or capacitors from tunable PIN diodes or tunable dielectric materials such as various forms of BST.

Any of the passive cancellation function circuits 103, 105, or 203, or conventional duplexer 303 may use, as part of its construction, a filter transfer function. The filter transfer functions can be implemented by various filter topologies and synthesis methods, including ladder, coupled resonator-based, comb-line, Chebyshev, Butterworth, Bessel, or elliptic.

Any of the passive cancellation function circuits 103, 105, or 203, as part of its construction, may use phase shifters. The phase shifter function can be implemented by various passive topologies, including reflection type, vector modulator, and narrow-band filter based.

The passive cancellation-based duplexers may use a circulator to connect the RX and TX port to the same antenna. The circulator may not have enough isolation from TX to RX and consequently a passive cancellation network may be used.

Figure 9:
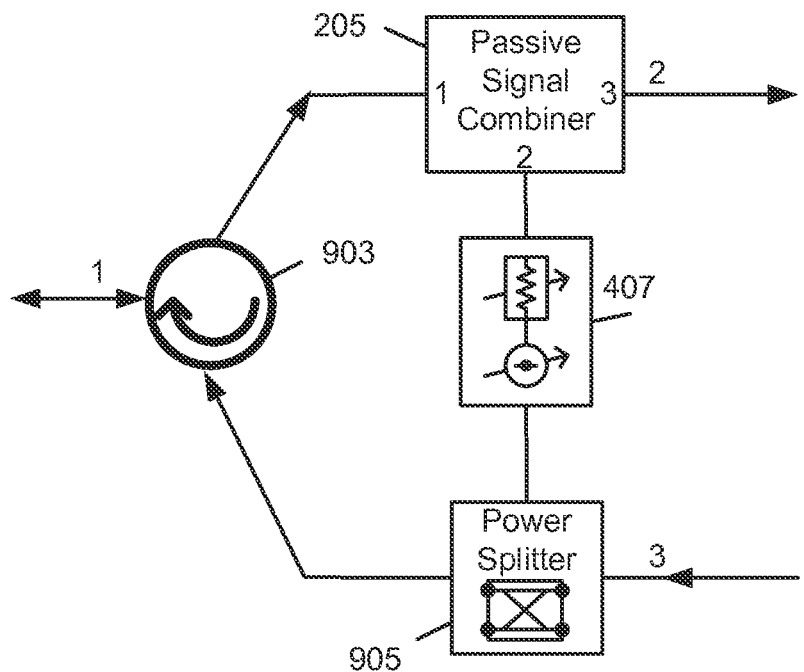
FIGS. 9, 10, and 11 illustrate example embodiments of passive cancellation-based duplexers.
Figure 10:
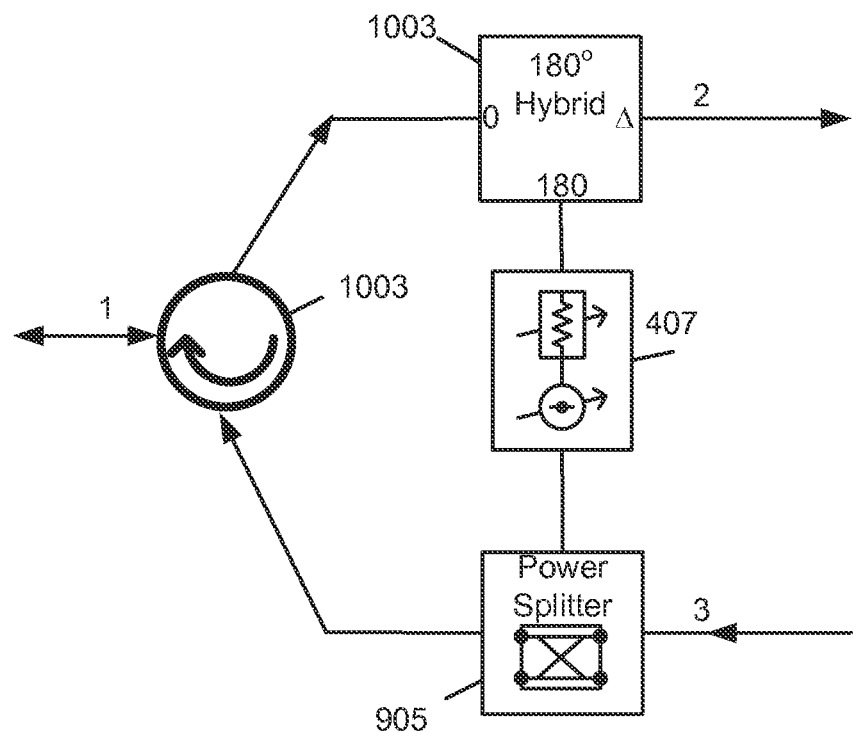
Figure 11:
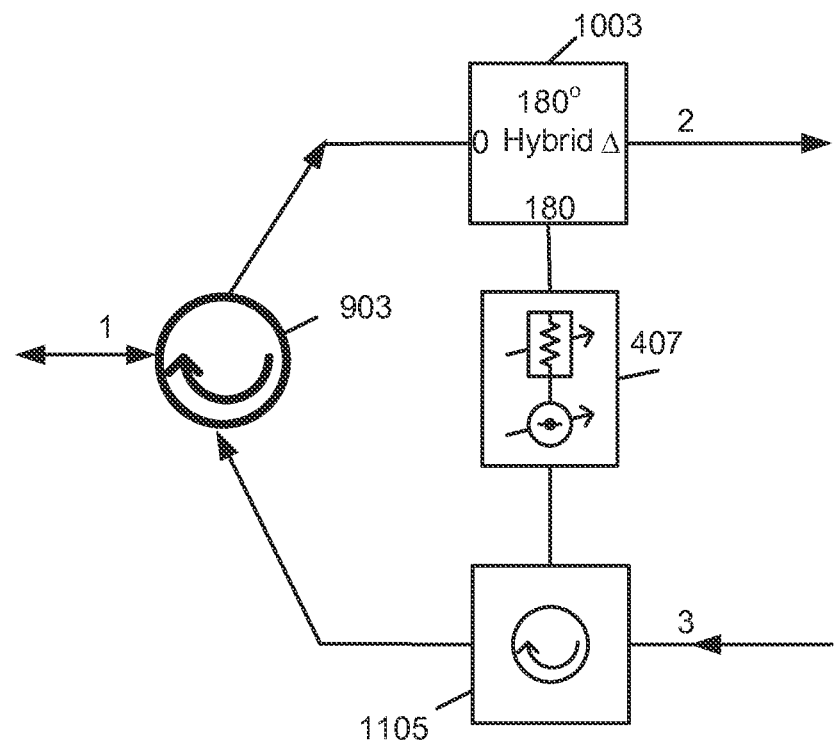

FIGS. 9, 10, and 11 illustrate example embodiments of passive cancellation-based duplexers. Such duplexers may include:

A circulator 903 to share an antenna port between the TX and RX.

A passive cancellation network 407.

A signal splitter, which could be a power splitter 905 or another circulator 1105.

A signal combiner 205, which could be a 180° hybrid 1003.

Passive cancellation-based duplexers may use an isolator to connect the RX and TX port to the same antenna. A passive cancellation network may be used to enhance isolation from TX to RX.

Figure 12:
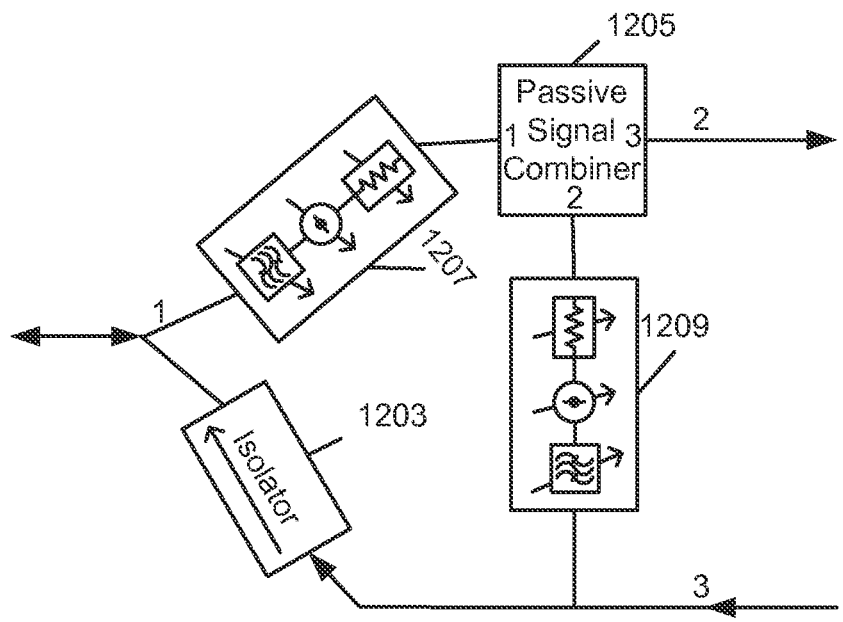
FIG. 12 is an example of a passive cancellation-based duplexer.

FIG. 12 is an example of a passive cancellation-based duplexer. Such a duplexer may include:

An isolator 1203 to connect TX to antenna port.

Two passive cancellation networks 1209 and 1207, where each may contain signal splitters and combiners, multiple adjustable attenuators and phase shifters, adjustable delay lines, and bandpass filters, any or all of which may be tunable.

A signal combiner 1205.

The parameters of the passive cancellation networks 1207 or 1209 or both may be adjusted to enhance isolation from TX to RX.

The passive cancellation networks and passive cancellation duplexers may be combined with a calibration algorithm contained with a computer-readable memory that is part of the device to adjust parameters of the passive cancelation network to achieve an optimum cancellation profile and, as a result, optimum or desired isolation from any aggressor TX to any victim RX. The calibration algorithm may be executed once or multiple times during operation in response to environmental changes such as changes in temperature or antenna port mismatch. The calibration algorithm may also be executed multiple times for each pair of TX and RX in a multi-radio system.

The algorithm may use signals already present or provided by the TX port, such as TX signal in the TX band, modulations, continuous wave, or noise, or signal from any other band present at the TX port. The algorithm may require the passive cancellation network to internally generate an example TX signal and apply it internally to the TX port. The signal may be a single tone, multi-tone, or noise like stochastic signal. The algorithm may use deterministic computation, correlation-based approaches to find the optimum solution.

Figure 14:
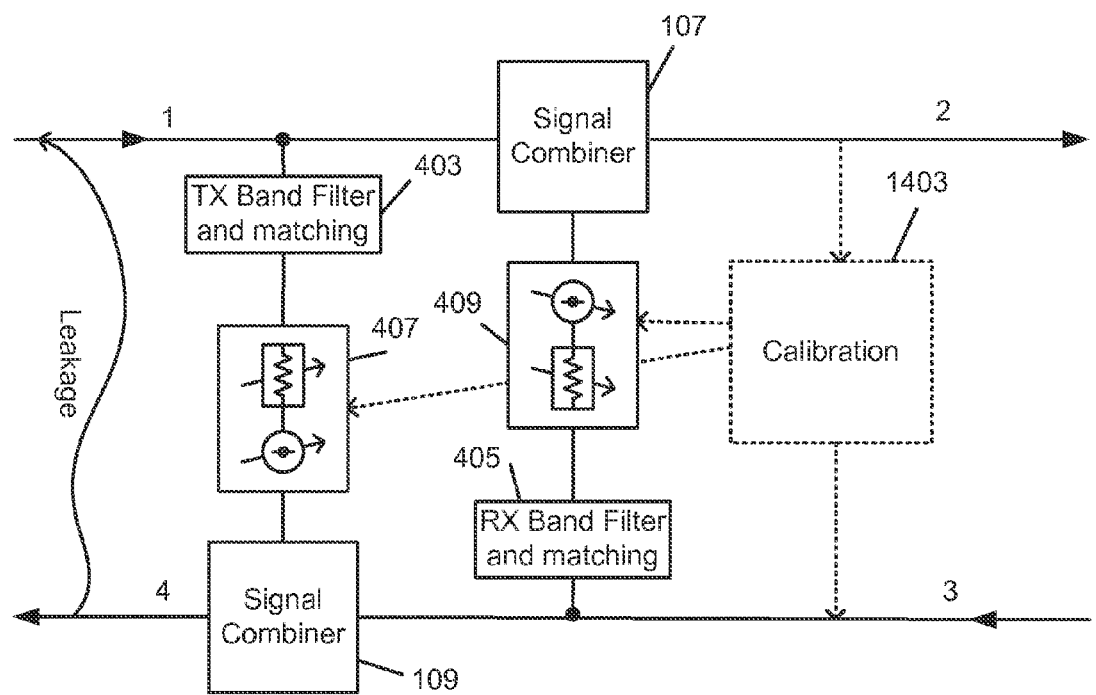
FIG. 14 is another example of a passive cancellation network.

FIG. 14 is an example of a passive cancellation network. A calibration circuit 1403 may apply a signal to the TX port of network. It may also sense or measure signals from RX port of the network. After proper signal processing, the calibration circuit 1403 may adjust parameters of the passive cancellation networks 407 and or 409 according to a desired cancellation outcome.

Figure 15:
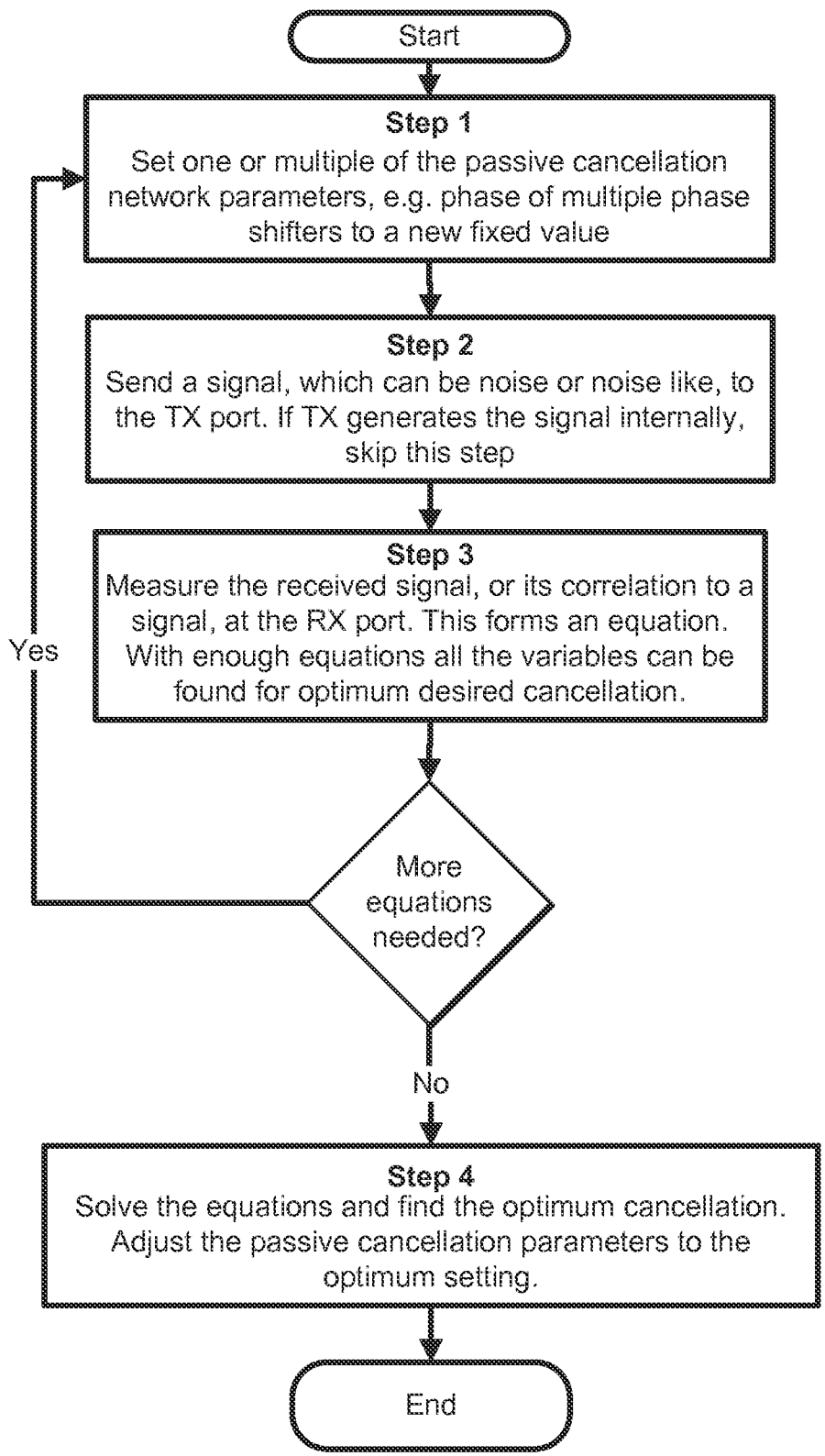
FIG. 15 illustrates an example of an algorithm that may be used to optimize a passive cancellation network.

FIG. 15 illustrates an example of an algorithm that may be used to optimize a passive cancellation network. In a step 1, the parameters of the passive cancellation networks may be fixed to a new value. For example, the phases of phase shifters may be set to a fixed value. In a step 2, a signal may be sent to the TX port. The signal may be already present at the port from the aggressor TX or may be internally generated by the passive cancelation network. In a step 3, the total received signal at the RX port, as a result of the signal passing through the cancelation path transfer function, as well as the leakage path may be measured. During this step, the extra signal processing may be performed, such as correlation of the received signal with some known signal. Or the received signal may just be used to form an overall transfer function equation from TX to RX. The process may be repeated to obtain enough equations to solve for all unknowns in a step 4. The number of required equations may depend on the number of unknown parameters, e.g. attenuation setting of attenuators, and phase of phase shifters, in the passive cancellation networks.

The calibration may be extended to a multi-TX multi-RX radio, where the calibration may be repeated for each passive cancellation network that enhances isolation between each RX-TX pair.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

For example, passive cancellation networks may be used to enhance isolation only for one of the RX band or TX band, or passive cancellation networks may be used to enhance isolation in other frequency bands, other than the TX or RX bands, such as the bands at harmonic frequencies of the RX band or the TX band. Various parts of the passive cancellation network may be physically separated and placed in different locations of a radio to improve performance or to simplify system integration. Variations of passive cancellation networks may be used to address emerging isolation requirements in sophisticated RF-front-end modules of wireless devices which may support various scenarios of carrier aggregation.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A radio frequency duplexer comprising:
    three terminals designated to as a common terminal, a first frequency terminal for a signal in a first frequency band, and a second frequency terminal for a signal in a second frequency band;
    a first passive filter in a path connecting the common terminal and the first frequency terminal;
    a second passive filter in a path connecting the common terminal and the second frequency terminal;
    a first passive feed-forward canceller in a path connecting the first frequency terminal and the second frequency terminal;
    a second passive feed-forward canceller in a path connecting the second frequency terminal and the first frequency terminal;
    wherein:
        the first passive filter has a passband that includes the first frequency band and a stopband that includes the second the frequency band; and
        the second passive filter has a passband that includes the second frequency band and a stopband that includes the first frequency band; and
        the first passive feed-forward canceller enhances the isolation between the first frequency terminal and the second frequency terminal at the second frequency band; and
        the second passive feed-forward canceller enhances the isolation between the first frequency terminal and the second frequency terminal at the first frequency band.

2. The radio frequency duplexer of claim 1 wherein the first passive feed-forward canceller includes a passive filter that is substantially the same as the second passive filter.

3. The radio frequency duplexer of claim 1 wherein the second passive feed-forward canceller includes a passive filter that is substantially the same as the first passive filter.

4. The radio frequency duplexer of claim 1 wherein the first passive feed-forward canceller or the second passive feed-forward canceller includes:
    at least one passive amplitude adjuster;
    at least one passive phase shifter; and
    at least one passive signal combiner.

5. The radio frequency duplexer of claim 4 wherein the first passive feed-forward canceller or the second passive feed-forward canceller includes a time delay element.

6. The radio frequency duplexer of claim 1 wherein the frequency response of the first passive filter or the second passive filter is tunable with an electrical stimuli.

7. The radio frequency duplexer of claim 1 wherein the first passive feed-forward canceller or the second passive feed-forward canceller includes a tunable passive component.

8. The radio frequency duplexer of claim 7 further comprising a sub-system that implements an algorithm that optimizes the values of tunable passive components to maximize the isolation between the first frequency terminal and the second frequency terminal at the first frequency band or the second frequency band.

9. The radio frequency duplexer of claim 1 wherein the first frequency band or the second frequency band corresponds to more than one continuous frequency band.

* * * * *